United States Patent
Leimgruber et al.

[11] 3,852,442
[45] Dec. 3, 1974

[54] PHARMACEUTICAL COMPOSITIONS CONTAINING ORGANOMETALLIC DERIVATIVES OF 6-LOWER ALKOXY-1-PHENAZINE 5,10-DIOXIDE

[75] Inventors: Willy Leimgruber, Montclair, N.J.; Gian Paolo Maestrone, Stanten Island, N.Y.; Milan Mitrovic, Nutley; Manfred Weigele, North Caldwell, both of N.J.

[73] Assignee: Hoffman-La Roche, Nutley, N.J.

[22] Filed: Apr. 23, 1971

[21] Appl. No.: 139,291

Related U.S. Application Data

[63] Continuation-in-part of Ser. No. 814,429, April 8, 1969, Pat. No. 3,586,674, which is a continuation-in-part of Ser. No. 739,191, June 24, 1968, abandoned.

[52] U.S. Cl............ 424/245, 260/242, 106/15 AF, 117/138.5, 162/161, 252/106, 252/107
[51] Int. Cl......................... A01n 9/22, A61k 27/00
[58] Field of Search...................... 424/245; 260/242

[56] References Cited
UNITED STATES PATENTS
3,586,674   6/1971   Leimbruber et al................ 424/245

OTHER PUBLICATIONS
R. Maestrone et al., Abstr. Papers–10th Intersci. Conf. on Antimicrob. Agents & Chemother., Chicago, Oct. 1970, p. 19.

*Primary Examiner*—Vincent D. Turner
*Attorney, Agent, or Firm*—Samuel L. Welt; Jon S. Saxe; William M. Farley

[57] ABSTRACT

Pharmaceutical compositions containing, as the active ingredient, copper derivatives of 6-lower alkoxy-1-phenazinol 5,10-dioxide and, in particular, the copper II complex of 6-methoxy-1-phenazinol 5,10-dioxide, possess broad spectrum antimicrobial activity.

32 Claims, No Drawings

PHARMACEUTICAL COMPOSITIONS CONTAINING ORGANOMETALLIC DERIVATIVES OF 6-LOWER ALKOXY-1-PHENAZINE 5,10-DIOXIDE

RELATED APPLICATIONS

This application is a continuation-in-part of U.S. Pat. application Ser. No. 814,429, filed April 8, 1969, now U.S. Pat. No. 3,586,674, which is, in turn, a continuation-in-part of U.S. Pat. application Ser. No. 739,191, filed June 24, 1968, now abandoned, the benefit of the dates of both is hereby claimed.

BRIEF DESCRIPTION OF THE INVENTION

This invention relates to pharmaceutical compositions efficacious in the topical treatment of microbial infections which contains as the active ingredient organometallic complexes of 6-lower alkoxy-1-phenazinol 5,10-dioxide containing 1 mole of copper for every 2 moles of 6-lower alkoxy-1-phenazinol 5,10-dioxide represented by the formula listed below:

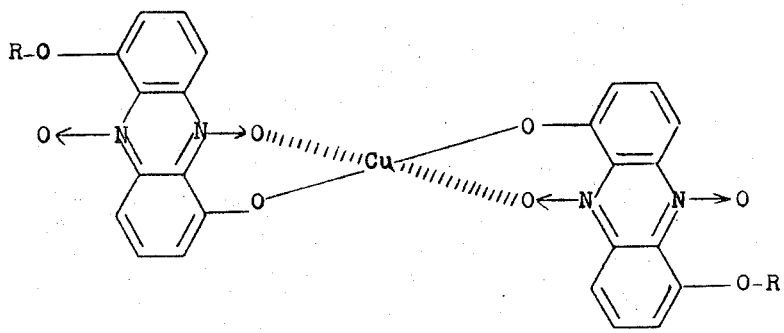

wherein R is lower alkyl of 1 to 3 carbon atoms, preferably methyl, ethyl or propyl.

DETAILED DESCRIPTION OF THE INVENTION

In particular, this invention relates to pharmaceutical compositions containing, as the active ingredient, novel copper (II) complexes formed from a 6-lower alkoxy-1-phenazinol 5,10-dioxide and a copper (II) salt and, preferably, the cupric complex of 6-methoxy-1-phenazinol 5,10-dioxide. This invention also relates to the use of such compositions in the treatment of topical diseases caused by microbial infection.

The novel compounds of this invention, i.e., the cupric complexes of formula I are prepared by combining a solution of a 6-lower alkoxy-1-phenazinol 5,10-dioxide with a solution of a cupric salt. The cupric complex can be isolated as crystals by precipitation from the mother liquors. The selection of a suitable solvent for the reactants is made by determining the relative solubilities which can be readily done by those of ordinary skill in the art. As the solvent, it is preferred to utilize a solvent in which both the 6-lower alkoxy-1-phenazinol 5,10-dioxide and the cupric salt reagents are more soluble than the complex reaction product formed therefrom. Examplary solvents which can be conveniently employed are the inert organic solvents such as acetonitrile, dimethyl formamide, dioxane, etc. Any cupric salt can be employed as starting material. However, since in the formation of the cupric complex of formula I there is also formed the acid corresponding to the anionic moiety of the cupric salts and the cupric complex is less stable under strongly acidic conditions, it is preferred to utilize a cupric salt of a weak acid. As a suitable cupric salt there can be utilized a cupric salt formed from any of the weak acids, e.g., acids having a pKa of about 4.2 or greater. Examplary acids answering this description are the organic acids such as the lower alkanoic acids, e.g., acetic acid, propionic acid, etc., benzoic acid and the like. There can also be employed cupric salts of mineral acids such as, for example, cupric sulfate. When employing a mineral acid salt it is preferred to utilize a buffered solvent system in order to avoid highly acidic conditions. The cupric complex of formula I can be readily prepared by simply combining a saturated solution of the 6-lower alkoxy-1-phenazinol 5,10-dioxide starting material in a suitable solvent with a saturated solution of a cupric salt in the same solvent at room temperature and separating the cupric complex which precipitates. Temperatures above room temperature can be employed in order to facilitate the solution and thereby reduce the amount of solvent needed. The precipitation of the complex can also be facilitated by cooling. The separation of the precipitated crystalline complex is accomplished by the usual techniques for solvent removal such as, for example, by filtration, solvent displacement followed by filtration, etc.

The 6-lower alkoxy-1-phenazinol 5,10-dioxide starting materials employed in the preparation of the copper complexes of this invention are known compounds or analogs which can be readily prepared by selectively alkylating the known compound 1,6-phenazinediol 5,10-dioxide (iodinin). The selective alkylation can be readily accomplished by treating a monoalkali salt of 1,6-phenazinediol 5,10-dioxide with an alkylating agent such as di-lower alkylsulfate. This process in its preferred mode is accomplished by first preparing the sodium salt of the 1,6-phenazinediol 5,10-dioxide from an alkali such as sodium hydroxide and thereafter treating with an alkylating agent in a nonaqueous aprotic solvent such as hexamethylphosphoric triamide (HMPT).

The novel cupric complexes of formula I have been found to possess broad spectrum antimicrobial activity. In particular, the cupric complex of 6-methoxy-1-phenazinol 5,10-dioxide has demonstrated a high level of activity against a wide variety of both Gram-positive and Gram-negative bacteria such as *Streptococcus pyogenes, Streptococcus agalactiae, Diplococcus pneumoniae, Staphylococcus aureus, Escherichia coli, Klebsiella pneumoniae, Proteus vulgaris, Pseudomonas aeruginosa, Salmonella typhosa, Salmonella schottmuelleri, Pasteurella multocida, Brucella suis, Bordetella bronchiseptica, Alkalygenes faecalis, Norcardia sp., Moraxella bovis, Erysipelothrix insidiosa, Mycobacterium tuberculosis* and *Mycoplasma gallisepticum*. They are also active against fungi and yeasts such as *Candida albicans, Tricophyton mentagrophytes, Trichophyton schoenleini, Trichophyton granularis, Tricophyton interdigitalis, Microsporum canis, Microsporum audouini, Microsporum gypseum*,

*Microsporum namum, Ustilago zeae, Fusarium oxysporum, Botrytis paeoniae, Aspergillus flavus, Aspergillus fumigatus* and *Aspergillus niger;* against protozoa such as *Trichomonas vaginalis* and *Trichomonas foetus;* and against helminths such as *Syphacia obvelata* and *Ascaris suum.* The novel cupric complexes of this invention are also active against plant pathogens and can be employed as foliar fungicides or soil fungicides. These compounds have, for example, demonstrated a high degree of activity against *Phytophthora infestans,* the causative organism in late blight of tomatoes and against *Xanthomonas vesicatoria,* the causative agent of bacterial leaf spot of tomatoes and against *Piricularia oryzae,* the pathogen associated with rice blast.

The pharmaceutical compositions of this invention containing the cupric complexes of formula I ae particularly useful in the treatment of plant and animal diseases of microbial origin by virtue of their low mammalian and phytotoxixity. When the cupric complexes of formula I are employed in the treatment of microbial, helminth and/or protozoal infections, they are conveniently utilized in pharmaceutical composition with suitable carrier materials for use as chemotherapeutic agents in combatting mammalian diseases. These compositions are formulated by uniformly distributing the active ingredient in a chemically compatible vehicle. The compositions are non-inhibiting with respect to the active ingredient and essentially non-injurious to body tissue under the conditions of use. When formulated into compositions suitable for topcial administration, formulations compounds of formula I are preferably employed in amounts ranging from about 0.05 to about 3.0% by weight of the chemotherapeutic composition, e.g., gel, cream, ointment, suspensions, suppository or the like. It will be understood that the cupric complexes of formula I when employed in forms suitable for topical administration may be utilized in diverse formulations: for example, solid formulations including finely divided powders and granular materials; liquid formulations including suspensions, wettable powders, concentrations, slurries, tinctures, sprays, aerosols and the like, depending on the application intended and the formulation media desired. They may be employed as creams, gels, jellies, ointments, pastes, etc. when utilizing formulations in which the cupric complexes have partial solubility, e.g., those containing propylene glycol, the molecular composition of the complexes may change in the solvent since some of the materials present including the solvent can act as ligands.

A still further aspect of this invention involves the use of the compositions containing these cupric complexes for a variety of industrial antimicrobial applications. Thus, the chemical, physical and biological properties of the cupric complexes make them suitable for the following uses: mildew proofing fabrics such as textiles, canvas and other woven and non-woven materials; as paint fungicides; as a fuel additive for the control of microbial growth; as preservative agents for clothes and shoes; as topical antiseptics; as disinfectant agents; plant and tree spray, antimycotic agents for soaps; mildew proofing agents in plastics, cardboard, fiberboard, paper, etc.; slimicides in pulp liquors, etc.; food preservatives; additives for soaps and detergents, etc.; additives in cosmetics, shampoos, deodorants, mouthwashes, etc.

Furthermore, as prepared by the above described methods, 90% of the particles of the preferred compound, the copper complex of 6-methoxy-1-phenazinol 5,10-dioxide, are below 10 microns in size and, in fact, are usually below 5 microns with the remaining 10% below 20 microns in size. On standing, the particles in the pure form have a strong tendency to form aggregates of from about 400 to about 600 microns in size. However, the copper complexes of 6-methoxy-1-phenazinol 5,10-dioxide must have an initial particle size distribution of 5–20 microns to provide an increased surface area and to afford sufficient solubility so as to achieve an effective degree of pharmacological activity in the various pharmaceutical preparations. Since the material is sensitive to heat, shock and static electricity, the conventional means of deaggregation, e.g., jet-milling or attrition, are not acceptable because of the explosion hazard. However, by the use of a process not part of this invention, i.e., ultrasonic deaggregation, the copper complex aggregates can be safely reduced to their micronized form as discrete ultrafine particles in the required particle size range, i.e., 5 to 20 microns.

In one of its more particular aspects, the pharmaceutical compositions of this invention containing, as the active ingredient, the cupric complexes and, in particular, the 6-methoxy-1-phenazinol 5,10-dioxide, cupric complex, have demonstrated a remarkably high degree of activity both in vitro and in vivo against pathogens, particularly the bacteria and yeasts which are the etiologic agents of bovine mastitis. Known anti-mastitis agents are not completely satisfactory since their effectiveness is limited by their relatively narrow spectra of anti-microbial activity and also by their irritation affects. Thus, the compositions of this invention containing as the active ingredients the cupric complexes which have potent broad spectrum anti-microbial activity and non-irritating properties are particularly effective as anti-mastitis agents. In particular, the compositions containing 6-methoxy-1-phenazinol 5,10-dioxide, cupric complex, have been found in actual application to the udder of ruminants, especially cows, to be non-irritating, potent anti-mastitis agents. The compounds of formula I when used as anti-mastitis agents can be applied either internally or externally to the udder of the animal in compositions suitable either for topical administration, e.g., inserts, or for intramammary infusion.

Thus, in a more specific embodiment this invention comprises the use of a pharmaceutical composition containing, as the active ingredient, a compound of formula I as an anti-mastitis preparation suitable either for topical or intramammary administration.

Intramammary infusion preparations typically contain oil dispersible or water dispersible vehicles. The vehicles are composed of inert ingredients, e.g., surface active agents, anti-oxidants and the like with vegetable oil or water carriers. Typical ingredients which are pharmaceutically acceptable for use in compositions used for intramammary infusion administration are sodium citrate, citric acid, magnesium aluminum silicate (Veegum K), carboxymethyl cellulose, Tween 80, sorbitol, glycerin, microcrystalline cellulose (Avidel), propylene glycol, benzyl alcohol, polyoxyethylene 20-sodium monostearate (Tween 60), BHA, BHT, lecithin, finely divided silica (Cab-O-Sil), hydrogenated castor oil (12 Hydroxy Stearin), methyl paraben, propyl paraben, chlorobutanol, aluminum monostearate, sorbitan monostearate (Span 60), modified 1-hydroxy stearin (Thixcin R) glycerol monostearate, polyoxyethylene sorbitol tristearate, Freon 12, Freon 14, dimethyl polysiloxane and methyl cellulose as, for example, hydroxypropylmethyl cellulose (Methocel 4000 65 HG).

Representative formulations incorporating the copper complex of 6-methoxy-1-phenazinol 5,10-dioxide, hereinafter referred to as copper myxin, as the anti-mastitis agent are listed below.

|  | I mg/gm | % by weight | II mg/gm | % by weight |
| --- | --- | --- | --- | --- |
| Copper Myxin | 1.05 | 0.105 | 1.12 | 0.12 |
| Methocel 4000 65 HG | 25.0 | 2.5 | 22.5 | 2.25 |
| Benzyl alcohol | 0.01 | 0.001 | 0.01 | 0.001 |
| Cupric acetate monohydrate | 0.038 | 0.0038 | 0.038 | 0.0038 |
| Sodium acetate trihydrate | 2.0 | 0.20 | 2.0 | 0.20 |
| Sodium chloride | 8.5 | 0.85 | 8.5 | 0.85 |
| Dist. water q.s. | 1 gm | 96.3 | 1 gm | 96.6 |

Copper myxin has a tendency to dissociate to 6-methoxy-1-phenazinol 5,10-dioxide, hereinafter referred to as myxin, especially in aqueous systems. However, by use of a process not part of this invention but included here for completeness, i.e., the addition of excess copper ions, the stabilization of copper myxin in the anti-mastitis formulation is achieved. Hence, copper acetate is added to the above formulations in an amount sufficient to provide a 2–20 mole percent excess of copper based on the total copper in copper myxin. This depresses the dissociation to free myxin and thus stabilizes the copper complex, a stability retained even at elevated temperatures. Furthermore, since copper myxin is most stable at a pH of about 6–6.5 and since the copper ions will precipitate as the hydroxide in alkaline solution, the solution is adjusted to a pH of about 6 by the use of an acetic acid/sodium acetate buffer.

In vivo tests on mice infected with mastitis isolates have been shown to demonstrate the anti-mastitis effectiveness of known anti-mastitis agents and such in vivo test results have been well correlated with anti-mastitis activity in animals susceptible to mastitis infections, e.g., dairy cows. The test procedure involves determination of activity in the presence of milk to insure effectiveness in the presence of organic fluids. The in vivo test method employed in the determination of the anti-mastitis activity of the pharmaceutical compositions containing the compounds of formula I is as follows.

Material and Methods

Medium

Sterile milk containing less than 1 bacteria/5 ml is prepared.

Cultures

Bacterial strains used to contaminate the milk are field isolates of bovine mastitis and are maintained on tryptose agar. Twenty-four hours growth on tryptose agar is used for contaminating the milk. The final concentrations of the organisms in the milk are as follows:

a) *Streptococcus agalactiae* - $5 \times 10^7$
b) *Staphylococcus aureus* - $2 \times 10^9$
c) *Escherichia coli* - $2 \times 10^9$
d) *Pseudomonas aeruginosa* - $5 \times 10^8$ The subcutaneous injection into 18 to 20 gram mice of 0.5 ml of milk contaminated with the strains indicated above induces lesions. The mice to be infected with *Streptococcus agalactiae* are preconditioned with triaminolone acetonide in order to show well defined lesions.

Testing Procedure

A 50 mg amount of 6-methoxy-1-phenazinol 5,10-dioxide, cupric complex is micronized and dispersed into 10 ml of sterile distilled water, pH 7 to 7.2 and further dilutions containing 1, 0.2, 0.04 and 0.008 mg of compound per ml are similarly prepared in sterile distilled water. A 0.05 ml amount of each dilution of the compound is added to a tube containing 4.5 ml of contaminated milk (1 tube/dilution) so that the final concentrations of the compound in the milk are 500, 100, 20, 4 and 0.8 micrograms per ml. After vigorous shaking to assure a uniform distribution of the compound throughout the milk, 0.5 ml of each combination (contaminated milk plus compound) is injected subcutaneously into 4 white mice of 18 to 20 gram weight. Normal mice are used for the Staphylococcus, Coli and Pseudomonas infections while preconditioned mice (injected subcutaneously 24 hours in advance with 1 mg of triamcinolone acetonide) are used for the Streptococcus infection. Each group of mice is kept in a separate cage and receives normal pelleted food and water ad libitum. The animals are observed twice a day for two days after injection and sacrificed on the third day. A record is kept for signs and deaths. An autopsy is performed on all mice which die during test and on all survivors sacrificed on the third day of the test. Activity of the compound against the 4 bacterial strains is evaluated as follows: Streptococcus - absence of pus and necrosis at the site of the injection; Staphylococcus - absence of necrosis at the site of the injection and lack of signs and death; Coli - absence of heavy fibrinous infiltration at the site of the injection; Pseudomonas - absence of gelatinous edema and necrosis at the site of injection, lack of signs and death.

Controls

Controls are run with every test to establish:

1. sterility of milk, saline and distilled water used in the test;
2. bacterial count of the contaminated milk;
3. purity of the strains used to contaminate the milk;
4. titration of the infecting inoculum in mice;
5. lack of pathogenic effect of non-contaminated milk.

Evaluation of the Results

Using the method described, the following criteria and parameters are obtained:

1. protection of animals from local lesions induced by inoculation of milk contaminated with *Streptococcus agalactiae*, *Staphylococcus aureus*, *Escherichia coli* and *Pseudomonas aeruginosa;*
2. protection from death and clinical symptoms induced by Staphylococcus and Pseudomonas.

Results

Using this procedure, the activity of the anti-mastitis formulations is established against four strains of bacteria. The following are the results of the testing of an exemplary compound useful in the compositions of this invention. Tables I and II show the anti-bacterial efficacy both in vitro and in vivo.

Table I

In vitro activity of 6-alkoxy-1-phenazinol 5,10-dioxide, cupric complexes

| Organism | MINIMUM INHIBITORY CONCENTRATION, mcg/ml | |
| --- | --- | --- |
|  | 6-methoxy-1-phenazinol 5,10-dioxide, cupric complex | 6-ethoxy-1-phenazinol 5,10-dioxide, cupric complex |
| Streptococcus agalactiae | less than 0.16 | less than 4 |
| Staphylococcus aureus | 0.16 | less than 4 |
| Escherichia coli | 2.4 | 20 |
| Pseudomonas aeruginosa | 12 | 100 |

Table II activity as $ED_{50}$ mcg/ml

| Compound | In vivo anti-bacterial | | | |
| --- | --- | --- | --- | --- |
|  | S. agalactiae | S. aureus | E. coli | P. aeruginosa |
| 6-methoxy-1-phenazinol 5,10-dioxide, cupric complex | 0.8 | 60 | 12 | 60 |

In addition to their use as anti-mastitis agents, the compositions containing the compounds of formula I are useful in the treatment of a wide variety of animal and plant infections. The compositions have been found to be particularly useful in the treatment of localized animal infections caused by a variety of organisms. The compositions containing the cupric complexes can also be effectively employed in medical therapy such as the treatment of bacterial, yeast an/or mycotic infections of man and animals where the skin, hair, nails and/or other areas of body are infected.

However, the copper complexes are either large particle size agglomerates or, if in micronized form, fine powders. As such they are physically unsuitable for use along, i.e., without suitable excipients, in the treatment of topical microbial infections.

Thus, in a specific embodiment, this invention involves the use of novel compositions containing the copper complexes of 6-lower alkoxy-1-phenazinol 5,10-dioxides for the treatment of infections of the skin, ear, eye and genitals of animals.

This invention thus also relates to the use of pharmaceutically acceptable cream and ointment compositions of the copper complex of 6-lower alkoxy-1-phenazinol 5,10-dioxides in combatting various topical microbial infections.

Cream base pharmaceutical formulations acceptable for use with the copper complexes of 6-lower alkoxy-1-phenazinol 5,10-dioxides comprise aqueous emulsions containing a fatty acid alcohol, a semisolid petroleum hydrocarbon, a 1,2-glycol, an emulsifying agent and from about 2% to about 20% molar excess of copper ions over the copper present in the copper complex.

Ointment pharmaceutical formulation acceptable for use with the copper complexes of 6-lower alkoxy-1-phenazinol 5,10-dioxides comprise admixtures of a semi-solid petroleum hydrocarbon with a solvent dispersion of a copper complex.

Cream Formulation

Cream compositions of the copper complexes of 6-lower alkoxy-1-phenazinol 5,10-dioxides, preferably the copper complex of 6-methoxy-1-phenazinol 5,10-dioxide, comprise emulsions formed from a water phase of a humectant, a viscosity stabilizer and water, an oil phase of a fatty acid alcohol, a semi-solid petroleum hydrocarbon and an emulsifying agent and a phase containing the active copper complex dispersed in an aqueous stabilizer-buffer solution.

The water phase comprises, as the humectant, a pharmaceutically acceptably polyhydric alcohol as, for example, a 1,2-glycol of the formulat $RCHOHCH_2OH$ wherein R is an alkyl of from 1 to 5 carbon atoms. A particularly effective polyhydric alcohol, and the preferred one of this invention, is propylene glycol. Although the polyhydric alcohols help to maintain copper myxin in the emulsion, their concentration therein is not critical, an effective concentration being from about 5 to about 20% by weight with a preferred concentration being from about 12 to about 15% by weight.

A methyl cellulose or hydroxypropylmethyl cellulose is added to stabilize the viscosity of the cream during storage. Particularly effective is a hydroxypropylcellulose known as Methocel 65 HG 4000 from Dow Chemical. The effective concentration range is from about 0.1 to about 5% by weight with from about 0.5 to about 0.8% preferred.

In the oil phase, the fatty acid alcohol component, which functions as a stabilizer, is derived from the reduction of a long-chain saturated fatty acid of from about 14 to about 20 carbon atoms as, for example, stearyl and cetyl alcohol. The effective concentration is from about 10 to about 30% by weight with an optimum concentration of from about 15 to about 20% by weight. Stearyl alcohol is the preferred component.

The semi-solid petroleum hydrocarbon emollient of the oil phase is a purified mixture of hydrocarbons of the methane series having the formula $C_nH_{2n+2}$ and known, in general, by the names petrolatum, petroleum jelly or vaselin. These materials have a melting range of from about 34 to about 54°C., a density range of from about 0.820 to about 0.870 and a refractive index range of from about 1.460 to about 1.474. The preferred material is Petrolatum Perfecta, a purified mixture of semi-solid hydrocarbons ($C_{20}$–$C_{22}$) from petroleum, melting point range 38–50°C. It is used in concentrations of from about 5 to about 40% by weight with from about 10 to about 15% by weight preferred.

Finally, the oil phase can optionally contain water-soluble emulsifying agents such as polyoxyethylene glycol and polyoxypropylene glycol, used in effective concentrations, i.e., from about 5 to about 8% by weight.

Copper myxin either as prepared or subsequently micronized is sufficiently stable in the excipients used in formulations to provide the concentration needed for therapeutic use. However, since the creams are oil-in-water emulsions, excipients which function not only as emulsifying agents but also are compatible with copper myxin are required. If the copper myxin is added directly to the cream base, immediate formation of free myxin occurs because of the greater solubility of myxin in the oil phase of the emulsion and the greater solubility of the copper ions in the water. If, however, the copper myxin complex, in a dispersion, is added to an emulsion precursor in an early stage of the preparatory procedure, that is, before final preparation of the cream, this dissociation to free myxin does not occur.

The dissociation of copper myxin is increased, as discussed earlier, by the presence of the two phases in the emulsion. Again, however, this dissociation potential to myxin is overcome and the cream stabilized by the addition of excess copper ions (e.g., from copper acetate) to the formulation.

Ointment (Gel) Formulations

Ointment compositions of the copper complexes of 6-lower alkoxy-1-phenazinol 5,10-dioxide, preferably copper myxin, comprise admixtures of a solvent dispersion of the copper complex and a semi-solid petroleum hydrocarbon.

The semi-solid petroleum hydrocarbon, as discussed earlier, is a purified mixture of hydrocarbons of the methane series having the formula $C_nH_{2n-2}$ and known, in general, as petrolatum, petroleum jelly or vaselin. The preferred material is Ultima White Petrolatum, characterized as having a melting point of 130–140°F., a Saybolt Viscosity at 210°F. of 60–66 and a consistency, determined by penetration at 77°F., of 160–190. The petrolatum's concentration range is from about 80% to about 95% by weight with from about 90% to about 95% by weight preferred.

The dispersion of copper myxin in a solvent is achieved, as discussed earlier, using the ultrasonic deaggregation technique whereby a dispersion of micronized copper myxin in a suitable solvent if formed. The choice of solvent is not critical, limiting criteria being wetting of the cohesive aggregates of copper myxin and, since the dispersion is added directly to the ingredients in the ointments, compatability with the excipients in the ointment formulation. Representative solvents include carbon tetrachloride, acetone and straight-and-branch-chained hydrocarbon solvents such as Cosmetic Liquid 687 (Isopar - a highly purified, saturated $C_{12}-C_{14}$ branched-chain hydrocarbon from Humble Oil & Refining Co.). A dispersion containing sufficient copper myxin to provide from about 0.1 to about 1.5% by weight of copper myxin in the final formulation should be prepared. The concentration of solvent used, which is not critical, can range from about 2% to about 20% by weight with from about 5 to about 9% by weight preferred.

Anti-Microbial Activity

The anti-bacterial activity of these compositions against skin infections caused by *Staphylococcus aureus* and *Pseudomonas aeruginosa* has been shown by the following in vivo tests.

Scarification of rabbit skin followed by infection with *Staphylococcus aureus* and *Pseudomonas aeruginosa*. Two rabbits/infection. Treatment - 4 days, total treatments - 7. Therapeutic efficacy is obtained by compounding clinical observations after 1, 2 and 3 days of treatment and 3 days after the end of treatment and comparing the treated with the non-treatd and the placebotreated areas.

| PER CENT Compound | THERAPEUTIC EFFICACY | |
|---|---|---|
| | S. aureus | P. aeruginosa |
| 6-methoxy-1-phenazinol 5,10-dioxide, cupric complex | | |
| -0.5 percent | 70 | 48 |
| 0.1 percent | 57 | 78 |

The activity against yeast has been demonstrated by the following test in animals.

New Zealand white rabbits conditioned with triamcinolone acetonide were infected by scarification with a strain of *Candida albicans* and treated for two cycles of 5 days with experimental formulations. Therapeutic efficacy is evaluated by scoring the lesions for improvement at weekly intervals and comparing the treated with the non-treated and placebo-treated areas of the skin.

| Compound | Per Cent | THERAPEUTIC EFFICACY PER CENT | | |
|---|---|---|---|---|
| | | 1 week treatment | 2 week treatment | 1 week after treatment |
| 6-methoxy-1-phenazinol 5,10-dioxide, cupric complex - gel | 0.5 | 73 | 58 | 100 |
| | 0.1 | 47 | 34 | 45 |
| | 0.02 | 60 | 92 | 89 |
| Gel placebo | — | 40 | 0 | 11 |
| 6-methoxy-1-phenazinol 5,10-dioxide, cupric complex - cream | 0.1 | 46 | 88 | 82 |
| Cream placebo | — | 27 | 41 | 40 |
| 6-methoxy-1-phenazinol 5,10-dioxide, cupric complex in petrolatum base | 0.5 | 77 | 89 | 100 |
| Petrolatum placebo | — | 31 | 11 | 33 |

Anti-fungal activity has been demonstrated in animals by the following test.

Albino guinea pigs conditioned with triamcinolone acetonide were infected by multiple stabbing with a spore suspension of *Trichophyton mentagrophytes* and treated for two cycles of 5 days with experimental formulations. Therapeutic efficacy is evaluated by scoring the lesions for clinical improvement at weekly intervals and comparing the treated with the non-treated and placebo-treated areas of the skin.

ANTI-TRICHOPHYTON MENTAGROPHYTES ACTIVITY

| Compound | Per cent | THERAPEUTIC EFFICACY PER CENT | | |
|---|---|---|---|---|
| | | 2 week treatment | 1 week after treatment | 2 weeks after treatment |
| 6-methoxy-1-phenazinol 5,10-dioxide, cupric complex - gel | 0.5 | 96 | 99.5 | 98.5 |
| | 0.1 | 75 | 77 | 71 |
| | 0.05 | 65 | 65 | 61 |
| 6-methoxy-1-phenazinol 5,10-dioxide, cupric complex - cream | 0.5 | 87 | 86 | 94 |
| | 0.1 | 42 | 82 | 81 |
| Cream placebo | — | 23 | 6 | 32 |
| 6-methoxy-1-phenazinol 5,10-dioxide, cupric complex in petrolatum base | 0.5 | 78 | 89 | 79 |
| Petrolatum placebo | — | −10 | −20 | −30 |

Foliar fungicide activity of the novel complexes of this invention has been demonstrated in standard tests for foliar fungicide activity. Exemplary results of such tests with 6-methoxy-1-phenazinol 5,10-dioxide, cupric complex are shown in the following table.

| Compound | Concentration (PPM) | Plant Pathogen percent control:plant injury* |
|---|---|---|
| 6-methoxy-1-phenazinol 5,10-dioxide, cupric complex | 100 | Phytophthora infestans 74:0 |
| | | Xanthomonas vesicatoria 82:0 |
| | | Piricularia oryzae 66:0 |

* O indicates no visible effect

The activity against protozoa has been demonstrated by the following tests in animals infected with *Trichomonas vaginalis*.

Groups of 7 to 8 albino mice weighing 18 to 20 grams were infected subcutaneously on the abdominal surface with approximately 500,00 cells. The animals were treated by infiltration into the site of infection with dose levels of the compounds of formula I of from 2 mcg. to 1000 mcg. per ml. of solution on the day of the infection and the day after infection. The mice were examined the third day after infection for lesions at the site of the infection. The number of animals with lesions and the number of lesion-free animals were determined for each dose level tested.

The $CD_{50}$ was calculated using the method of Reed and Muench [American Journal Hygiene, Vol. 27, page 493 (1938)].

EXAMPLE 1

Preparation of 6-methoxy-1-phenazinol 5,10-dioxide, cupric complex

To a solution of 6 g. of 6-methoxy-1-phenazinol 5,10-dioxide in 3.1 of acetonitrile was added with stirring a 75°C. solution of 3 g. cupric acetate monohydrate in 900 ml. acetonitrile. The mixture was allowed to cool and was kept at room temperature for 3 hours. The precipitate cupric complex was collected by filtration and washed thoroughly on the filter, first with acetonitrile and then with ether. Thus, 6.1 g. of the complex were obtained in the form of dark green, fine crystals. Pertinent absorption bands in the IR spectrum: 1365 $cm^{-1}$ (in Fluorolube); 1059, 776, 578 $cm^{-1}$ (in Nujol). U.V. absorption maxima in DMSO:

287 m$\mu$ = ($\epsilon$ - 68,500)
300 m$\mu$ = ($\epsilon$ - 63,200)
356 m$\mu$ = ($\epsilon$ - 10,000)
408 m$\mu$ = ($\epsilon$ - 10,400)
610 m$\mu$ = ($\epsilon$ - 9,500)

Analysis
  Calculated for $C_{26}H_{18}N_4O_8Cu$ -
    C, 54.03; H, 3.14; N, 9.69; Cu, 10.99
  Found:  C, 53.71; H, 3.31; N, 9.66; Cu, 10.92

EXAMPLE 2

In analogy to the procedure described in Example 1 above, there was also prepared 6-ethoxy-1-phenazinol 5,10-dioxide, cupric complex starting with 6-ethoxy-1-phenazinol 5,10-dioxide.

Analysis
  Calculated for $C_{26}H_{22}N_4O_8Cu$ -
    N, 9.25
  Found: N, 9.12

| Compound | Dose mcg./ml. s.c. | No lesion | Lesion | Cumulative No lesion | Lesion |
|---|---|---|---|---|---|
| 6-methoxy-1-phenazinol 5,10-dioxide, cupric complex | 1000 | 35 | 5 | 121 | 5 |
| | 400 | 22 | 10 | 86 | 15 |
| | 200 | 19 | 12 | 64 | 27 |
| | 100 | 11 | 5 | 45 | 32 |
| | 40 | 11 | 5 | 34 | 37 |
| | 20 | 11 | 5 | 23 | 42 |
| | 10 | 7 | 1 | 12 | 43 |
| | 4 | 3 | 5 | 5 | 48 |
| | 2 | 2 | 6 | 2 | 54 |

The $CD_{50}$ is 48 mcg./ml. s.c. based upon the data from the tests.

6-Propoxy-1-phenazinol 5,10-dioxide, cupric complex can be prepared also following the procedure described in example 1 and utilizing as the starting material 6-propoxy-1-phenazinol 5,10-dioxide.

EXAMPLE 3

A 6 ml. suspension is prepared by mixing together the following:

| | |
|---|---|
| 6-methoxy-1-phenazinol 5,10-dioxide, cupric complex | 10 mg. |
| Ethylenediamine | 57 mg. |
| Distilled monoglycerides | 60 mg. |
| Polyethylene glycol 400 (USP) | q.s. |

Infuse 6 ml into teat canal of each infected quarter. Repeat in 12 and/or 24 hours if necessary.

EXAMPLE 4

20 ml. suspensions are prepared using the following formulations:

| | | |
|---|---|---|
| a) | 6-methoxy-1-phenazinol 5,10-dioxide, cupric complex | 20 mg. |
| | Carboxymethyl cellulose | 2 percent |
| | Methylparaben | 0.1 percent |
| | Propylparaben | 0.025 percent |
| | Distilled water | q.s. |
| b) | 6-methoxy-1-phenazinol 5,10-dioxide, cupric complex | 30 mg. |
| | Carboxymethyl cellulose | 2 percent |
| | Methylparaben | 0.1 percent |
| | Propylparaben | 0.025 percent |
| | Tween 80 | 2 percent |
| | Distilled water | q.s. |
| c) | 6-methoxy-1-phenazinol 5,10-dioxide cupric complex | 40 mg. |
| | Carboxymethyl cellulose | 2 percent |
| | Chlorbutanol | 0.5 percent |
| | Distilled Water | q.s. |
| d) | 6-methoxy-1-phenazinol 5,10-dioxide cupric complex | 10 mg. |
| | Carboxymethyl cellulose | 2 percent |
| | Chlorbutanol | 0.5 percent |
| | Tween 80 | 2 percent |
| | Distilled water | q.s. |

Lactating cows are treated with 20 ml. of suspension in each infected quarter immediately after milking. The suspension is allowed to remain in the quarter until the next milking. The treatment is repeated at 24 hour intervals if necessary.

EXAMPLE 5

6-methoxy-1-phenazinol 5,10-dioxide, cupric complex - anti mastitis preparation - 0.1 per cent

| | Grams/Liter |
|---|---|
| 6-methoxy-1-phenazinol 5,10-dioxide, cupric complex | 1.00 |
| Polysorbate 80 (USP) | 60.00 |
| Sorbitan monooleate | 40.00 |
| Benzyl Alcohol | 10.00 |
| sodium acetate | 2.00 |
| Hydroxypropyl Cellulose (Klucel H.A.) | 19.0 |
| Distilled water q.s. | 1 liter |

Procedure

The 6-methoxy-1-phenazinol 5,10-dioxide, cupric complex and benzyl alcohol were triturated in a suitable size stainless steel container to form a paste. The Polysorbate 80, sorbitan monooleate and sodium acetate were slowly added in that order with constant stirring. The Klucel H.A. was dispersed in 850 ml. of distilled water at 50°C. and then cooled to 30°C. This was then added to the previous ingredients and stirred until homogeneous. The preparation was then brought to final volume with distilled water.

EXAMPLE 6

6-methoxy-1-phenazinol 5,10-dioxide, cupric complex - topical cream - 0.1 percent

| | Grams per Kilo Mg. per gram |
|---|---|
| Part I: | |
| Stearyl Alcohol | 125.00 |
| Petrolatum USP | 100.00 |
| Propyl-p-hydroxybenzoate (Nipasol USP) | 0.50 |
| Polyoxyethylene glycol (Myrj 52) | 40.00 |
| Part II: | |
| 6-methoxy-1-phenazinol 5,10-dioxide, cupric complex | 1.00 |
| Distilled water | 612.00 |
| Propylene Glycol | 120.00 |
| Methyl-p-hydroxybenzoate (Nipagin) | 2.00 |

Procedure

1. The stearyl alcohol, petrolatum, nipasol and myrj were heated in a suitable size stainless steel container to 75°C.

2. The distilled water, propylene glycol and nipagin were heated in a separate suitable size stainless steel container to 75°C. and stirred well. The 6-methoxy-1-phenazinol 5,10-dioxide, cupric complex was then added and stirred well.

3. Part 2 was slowly added to Part I while slowly mixing with continuous stirring. The stirring was continued at low speed, using a Lightning Mixer, until the cream cooled to 35°C.

The cream was packaged in suitable size opal glass ointment jars.

Creams suitable for topical application according to the process of this invention will ordinarily contain from about 0.1 to about 1% by weight of active ingredient, preferably between about 0.1 and about 0.5% by weight.

EXAMPLE 7

6-methoxy-1-phenazinol 5,10-dioxide cupric complex - topical cream, 0.55%

A buffer solution, wherein neither the composition nor the process for its use are part of this invention but which is included here for completeness, of the following compositions is prepared.

| Ingredient | Gram/kg. of Final Cream | % by Total Weight of Final Cream Formulation |
|---|---|---|
| Sodium acetate trihydrate | 2.041 | 0.20 |
| Acetic acid, glacial | 0.05 | 0.005 |
| Water, distilled q.s. | 487.0 | 48.7 |

COPPER MYXIN DISPERSION PHASE

A copper myxin dispersion phase, constituted as listed below, is then prepared by disrupting copper myxin complex aggregates in the above buffer solution, to which has been added 0.190 grams of cupric acetate monohydrate, using an ultrasonic deaggregation and dispersion technique which is also not part of this invention but is included herein for completeness.

| Ingredient | Gram/kg. of Final Cream | % by Total Weight of Cream |
|---|---|---|
| Copper Myxin Complex | 5.5 | 0.55 |
| Buffer Solution | 100.0 | 10.0 |
| Cupric acetate monohydrate | 0.190 | 0.019 |

One hundred grams of this buffer solution containing cupric acetate monohydrate is added to 5.5 grams of the copper myxin complex aggregates in a beaker to wet and completely cover the aggregates. A probe, connected to an ultrasonic frequency-producing apparatus, such as a Sonifier cell disrupter supplied by Branson Sonic Power, is inserted into the beaker and vibrated at ultrasonic frequencies (18–20 kilohertz) for about 2 minutes. The aggregates are rapidly and completely disrupted to fine particles dispersed in the buffer solution. These dispersions are used directly in the preparation of the cream formulation.

The following emulsion precursors were then prepared.

OIL PHASE

| Ingredient | Gram/kg. | % by Total Weight of Final Cream Formulation |
|---|---|---|
| Stearyl Alcohol | 170.0 | 17.0 |
| Petrolatum Perfecta | 128.0 | 12.8 |
| Myrj 52 | 66.0 | 6.6 |

(Petrolatum Perfecta is a purified mixture of semisolid hydrocarbons ($C_{20}$-$C_{22}$) from petroleum, melting point range 38-50°C.

Myrj 52, a trademark of Atlas Chemical, is a polyoxyethylene glycol emulsifying agent soluble in water and alcohol, insoluble in cottonseed oil and mineral oil and milky in propylene glycol.)

WATER PHASE

| Ingredient | Gram/kg. | % by Total Weight of Final Cream Formulation |
|---|---|---|
| Propylene Glycol | 137.5 | 13.75 |
| Buffer Solution | 237.0 | 38.7 |

Both phases are heated separately to about 80°C. and, at that temperature, the water phase is added with constant agitation to the oil phase. The resulting cream emulsion is cooled slowly, under agitation, to 60°–65°C. and a buffer solution of hydroxypropylmethyl cellulose (Methocel 4000 65 HG) heated to 50°C. is admixed therewith. [This solution is prepared by dispensing 6.3 grams of the Methocel in 150 grams of the buffer solution at 70°C. using high speed agitation. The dispersion is refrigerated at 5°C. for 12 hours to hydrate the Methocel. The resulting solution is then heated to 50°C. before addition to the cream.] The copper myxin dispersion is added either when the cream temperature reaches 55–60°C. or when the cream begins to set up. Agitation continues until the cream has cooled to room temperature.

This cream is quite stable upon extended storage and under high shear stress. The amount of cupric acetate monohydrate added constitutes a 10 mole percent excess of copper over the total copper present in the copper myxin. The preparation has excellent stability at room temperature for up to 6 months.

EXAMPLE 8

6-methoxy-1-phenazinol 5,10-dioxide, cupric complex - topical ointment - 0.51%

A copper myxin dispersion was prepared by adding 7 grams of Cosmetic Liquid 687 Light (a highly purified, saturated $C_{12}$–$C_{14}$ branched chain hydrocarbon) to 0.51 grams of micronized copper myxin.

This dispersion is then added, with stirring using a Lightnin Mixer, to 92.49 grams of Ultima White Petrolatum U.S.P. heated to 60°–70°C. Ultima White Petrolatum has a melting point of 130°–140°F., a Saybolt Viscosity at 210°F. of 60–66 and a consistency, determined by penetration at 77°F., of 160–190. After the copper myxin is homogeneously incorporated therein, the formulation is cooled to room temperature.

The preparation has excellent stability at room temperature for up to 1 year.

EXAMPLE 9

This example illustrates the efficacy of copper myxin cream and ointment formulations in combatting various topical microbial infections.

Three types of topical microbial infections, i.e., bacterial, yeast and fungal, are established in susceptible animals and the efficaciousness of several copper myxin cream and ointment formulations are evaluated.

A. Bacterial Cutaneous Infections

The backs of New Zealand albino male rabbits are shaved and sites thereon infected by double scarification (24 hours apart) achieved by rubbing a heavy suspension of bacterial cells mixed with sterile sand on the skin until erythema develops. Two bacterial strains, a gram positive organism, *Staphylococcus aureus* ARS Strain No. 104 and a gram negative organism, *Pseudomonas aeruginosa* ARS Strain No. 409 are used.

Treatment, i.e., local application of cream or ointment, is started within four hours after the second scarification and continued for a total of three days. Therapeutic efficacy is determined by daily observations comparing the treated areas with the non-treated and placebo-treated areas.

Results are listed in Table 1. The cream formulation containing 0.5% copper myxin is highly effective in the treatment of the two infections from the viewpoint of both therapeutic efficacy and decrease in bacterial activity. All concentrations of copper myxin in topical ointment were effective.

Cultures, taken on selective media after termination of the treatment period, show that copper myxin in cream and ointment has good bactericidal activity.

In Tables 1, 2, 3 and 4, the cream formulations listed are constituted as detailed below.

| Ingredient | Percent By Weight Cream A | Cream B | Cream C |
|---|---|---|---|
| Stearyl Alcohol | 9.9 | 17.0 | 12.5 |
| Cetyl Alcohol | 1.5 | — | — |
| Petrolatum perfecta | 6.9 | 12.8 | 10.0 |
| Nipasol | 0.05 | — | — |
| Isopropyl Palmitate | 6.0 | — | — |
| Myrj 52 | 4.0 | 5.3 | 4.0 |
| Propylene Glycol | 11.9 | 13.8 | 12.0 |
| Nipagin | 0.2 | — | — |
| Water | 59.6 | 51.1 | 61.5 |

Table I

Therapeutic Efficacy of Copper Myxin Cream and Ointment Formulations in the Treatment of Cutaneous *Staphylococcus aureus* and *Pseudomonas aeruginosa* Infections of the Rabbit A. *Cream Formulations*

Therapeutic Efficacy %

| Formulation | S. aureus | | | | P. aeruginosa | | | |
|---|---|---|---|---|---|---|---|---|
| | 1st day | 2nd day | 3rd day | Average | 1st day | 2nd day | 3rd day | Average |
| Placebo (Cream A) | 16 | 0 | 0 | 5 | 0 | 0 | 0 | 0 |
| Placebo (Cream B) | 36 | 50 | 20 | 38 | 0 | 31 | 21 | 17 |
| Copper Myxin, 0.1% in Cream A | 50 | 33 | 66 | 50 | 66 | 66 | 84 | 72 |
| Copper Myxin, 0.1% in Cream B | 29 | 60 | 60 | 50 | 57 | 60 | 78 | 65 |
| Copper Myxin, 0.5% in Cream A | 50 | 66 | 84 | 67 | 33 | 50 | 33 | 39 |
| Copper Myxin, 0.5% in Cream B | 57 | 82 | 60 | 67 | 43 | 70 | 64 | 59 |

B. Ointment Formulations

| Formulation | Therapeutic Efficacy % S. aureus After 3 days | P. aeruginosa After 3 days |
|---|---|---|
| Placebo (Petrolatum ointment) | −7 | −66 |
| Copper Myxin, 0.25% in ointment | 63 | 60 |
| Copper Myxin, 0.50% in ointment | 69 | 69 |
| Copper Myxin, 1.0% in ointment | 73 | 57 |

B. C. Albicans Cutaneous Infection

Rabbits, preconditioned with 10 milligrams of triamcinolone acetonide 2 days prior to establishing the infection and 7.5 milligrams per week following establishment of the infection, are prepared as described in A above. Erythema is developed using medium grade sand paper and a heavy suspension of *C. albicans*, approximately $1.3 \times 10^9$ organism per ml., is then swabbed on the scarified areas.

Treatment, following the procedure described in A above and comprising daily application of the cream or ointment formulation, is initiated 3 to 4 days after infection and is continued over two cycles of 5 days interrupted by a 2 day rest period. Each preparation is tested on at least four animals at randomized sites.

The therapeutic efficacies of the copper myxin formulations are reported in Table 2. These results show that a 0.5% copper myxin cream is effective in combating *C. albicans* cutaneous infection and that the copper myxin ointment is effective at all dosages tested.

C. T. Metagrophytes Cutaneous Infection

A *T. mentagrophytes* spore suspension is tatooed into four sites on guinea pgis using a Sterneedle No. 6 cartridge.

A pigs are conditioned with triamcinolone acetonide starting 3 days after infection and continuing for the test period of 3 weeks.

Treatment, following the procedure described earlier, is started 6 hours after infection and continues for three cycles of 5 days with a 2 days rest period between.

Therapeutic efficacy of the cream is determined by comparison of the treated areas with the placebo-treated areas and is reported in Table 3.

Table 2

Therapeutic Efficacy of Copper Myxin Cream and Ointment Formulations in the Treatment of *C. albicans* Cutaneous Infection of the Rabbit A. Cream Formulation

| Formulation | After 1 week of Treatment | After 2 weeks of Treatment | Therapeutic Efficacy, % One Week After Treatment | Two Weeks After Treatment | Average |
|---|---|---|---|---|---|
| Placebo (Cream B) | 27 | 41 | 40 | 55 | 41 |
| Copper Myxin, 0.1% in Cream B | 46 | 88 | 82 | 77 | 73 |
| Copper Myxin, 0.5% in Cream B | 38 | 94 | 92 | 55 | 70 |

B. Ointment Formulations

| Formulation | After 10 days Treatment |
|---|---|
| Placebo (Petrolatum Ointment) | 12 |
| Copper Myxin, 0.25% in ointment | 57 |
| Copper Myxin, 0.50% in ointment | 40 |
| Copper Myxin, 1.0% in ointment | 32 |

Table 3

Therapeutic Efficacy of Copper Myxin Cream in Treatment of T. Mentagrophytes Cutaneous Infection

| | % Therapeutic Efficacy | |
|---|---|---|
| | Placebo (Cream C) | 0.5% Copper Myxin in Cream C |
| After 1 Week of Treatment | 5 | 100 |
| After 2 Weeks of Treatment | 36 | 95 |
| After 3 Weeks of Treatment | 60 | 98 |
| 1 Week Post Treatment | 58 | 98 |
| 2 Weeks Post Treatment | 57 | 95 |
| Average | 43 | 97 |

In addition, the efficacy of the cream and ointment formulations from the viewpoint of inhibition of the take of infection is determined by comparison of the treated areas with the placebo-treated areas. These results are reported in Table 4.

Table 4

Therapeutic Efficacy of Copper Myxin Cream and Ointment Formulations in Treatment of T. Mentagrophytes Cutaneous Infection

| | % Inhibition of Take of Infection | | | | | |
|---|---|---|---|---|---|---|
| | Placebo (Cream C) | 0.5% Copper Myxin in Cream C | Placebo (Petrolatum Ointment) | 0.25% Copper Myxin in Ointment | 0.52 Copper Myxin in Ointment | 1.0% Copper Myxin in Ointment |
| After 1 Week of Treatment | 0 | 100 | — | — | — | — |
| After 2 Weeks of Treatment | 0 | 69 | — | — | — | — |
| After 3 Weeks of Treatment | 0 | 83 | — | — | — | — |
| 1 Week Post Treatment | 0 | 66 | — | — | — | — |
| 2 Weeks Post Treatment | 0 | 58 | −220 | 47 | 77 | 83 |
| Average | 0 | 75 | — | — | — | — |

The cream formulation containing 0.5% copper myxin and all the ointment formulation evaluated were highly effective against the *T. mentagrophytes* infection.

D. *Microsporum canis* Cutaneous Infection

A *Microsporum canis* cutaneous infection is established on animals preconditioned with triamcinolone acetonide. The effectiveness of a 0.5% copper myxin cream and ointment are determined by topical application to the infected sites.

Treatment consists of daily application for one cycle of 3 days and for three additional cycles of 5 days each with a 2-day rest interval between cycles. The therapeutic efficacy of the cream and ointment are evaluated by comparison of the treated areas with the untreated areas. The results show that the 0.5% copper myxin cream and ointment formulations are therapeutically effective (i.e., 74% and 70% improvement, respectively, after 18 treatments).

Hence, these results indicate that copper myxin cream and ointment formulations are effective against cutaneous fungal infections.

We claim:

1. A composition for the treatment of localized topical microbial infections comprising as the active ingredient a compound represented by the formula

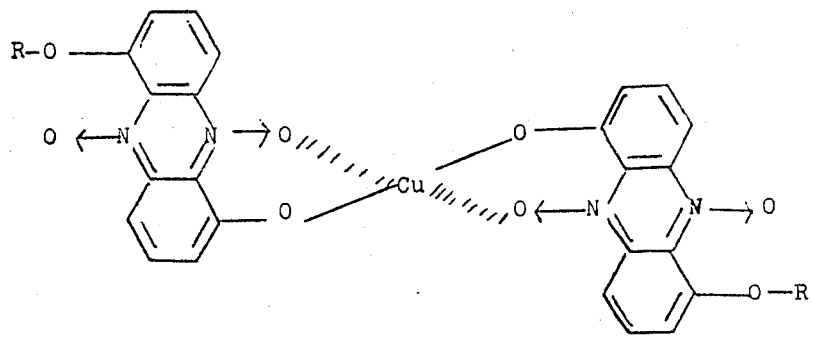

wherein R is lower alkyl of 1 to 3 carbon atoms together with a pharmaceutically acceptable carrier wherein the amount of the compound is effective in treating the localized topical microbial infection.

2. A composition for the treatment of localized topical microbial infections as in claim 1 wherein the topical microbial infection is mastitis.

3. The composition of claim 2 wherein the active ingredient is copper myxin represented by the formula

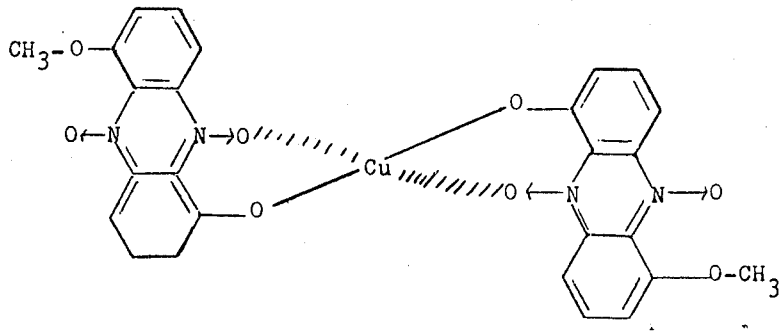

4. The composition of claim 3 comprising
a. from about 0.05% to about 1.5% by weight of copper myxin;
b. from about 1% to about 4% by weight of a hydroxypropylmethyl cellulose having a viscosity of 4000 centipoises in a 2% aqueous solution at 20°C.;
c. from about 0.005% to about 0.0015% by weight of benzyl alcohol; and
d. the remainder water.

5. The composition of claim 4 wherein the water component comprises an aqueous buffer solution at a pH of from 5.7 to 6.2 containing an amount of a soluble copper salt sufficient to yield an excess of copper ions of from about 2 to about 20 mole percent over the copper content of copper myxin.

6. A method of controlling mastitis in cattle which comprises applying to the infected area an amount of the composition of claim 2 effective in controlling mastitis.

7. The method of claim 6 wherein the applying is effected by intra-mammary infusion.

8. The method of claim 7 wherein the composition comprises as the active ingredient, an amount of copper myxin represented by the formula which is effective in controlling mastitis.

9. A method of treating localized topical microbial infections on mammals which comprises applying at the infection site, an amount of the composition of claim 1 which is effective in treating the localized topical microbial infection.

10. A method of treating topical bacterial infections of the skin on mammals which comprises applying at the site of the infection, an amount of the composition of claim 1 which is effective in treating the topical bacterial infection.

11. A method of treating topical yeast infections on mammals which comprises applying at the site of the infection, an amount of the composition of claim 1 which is effective in treating the topical yeast infection.

12. A method of treating topical fungus infections on mammals which comprises applying at the site of the infection, an amount of the composition of claim 1 which is effective in treating the topical fungus infection.

13. A method of treating foliar fungus infections of plants which comprises applying to the foliage of the plants, a composition comprising as the active ingredient an amount of a compound represented by the formula

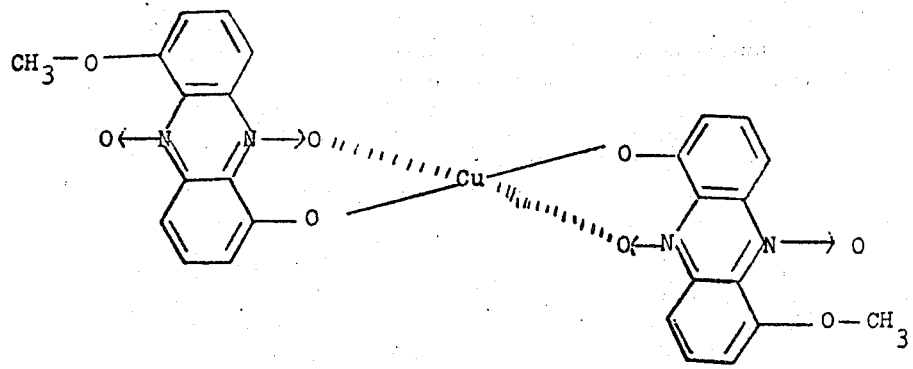

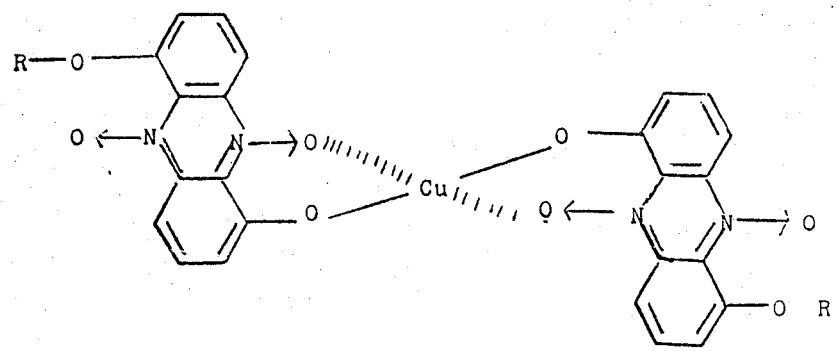

wherein R is lower alkyl of 1–3 carbon atoms together with agriculturally acceptable carrier which is effective in treating the foliar fungus infection.

14. A method of treating topical protozoan infections on mammals which comprises applying at the site of the infection, a composition comprising as the active ingredient an amount of a compound represented by the formula:

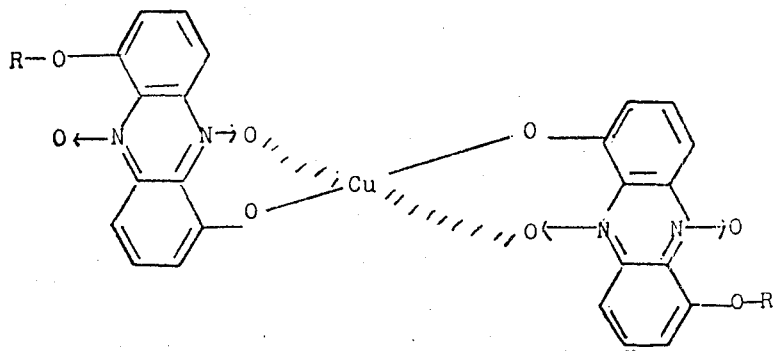

wherein R is lower alkyl of 1–3 carbon atoms together with a pharmaceutically acceptable carrier which is effective in treating the topical protozoan infection.

15. A pharmaceutically acceptable cream composition, efficacious in the treatment of topical microbial infections, comprising as the active ingredient an amount of from about 0.05% to about 3% of copper myxin which is effective in treating the topical microbial infection said copper myxin being in a cream base.

16. A pharmaceutical cream composition according to claim 15 wherein the copper myxin is in micronized form.

17. A pharmaceutical cream composition according to claim 15 which comprises:
   a. from about 5% to about 40% by weight based on the total weight of the cream of a petrolatum having a melting point range of from about 38° to about 50° C. and a hydrocarbon chain length of from about 14 to about 33 carbon atoms;
   b. from about 10% to about 30% by weight based on the total weight of the cream of a saturated, fatty acid alcohol having a hydrocarbon chain length of from about 14 to about 20 carbon atoms;
   c. from about 5% to about 8% by weight based on the total weight of the cream of polyoxyethylene glycol emulsifying agent which is soluble in water and alcohol, insoluble in cottonseed oil and mineral oil and milky in propylene glycol;
   d. from about 5% to about 20% by weight based on the total weight of the cream of a polyhydric alcohol of the general formula $RCHOHCH_2OH$ where R is a lower alkyl of from 1 to about 5 carbon atoms;
   e. from about 0.1% to about 5% by weight based on the total weight of the cream of a hydroxypropyl methyl cellulose having a viscosity of 4000 centipoises in a 2% aqueous solution at 20°C.;
   f. from about 2% to about 75% by weight based on the total weight of the cream of water and
   g. from about 0.05% to about 3% by weight based on the total weight of the cream of copper myxin.

18. A pharmaceutical cream composition according to claim 17 wherein the water component comprises an aqueous buffer solution at a pH of from 5.7 to 6.2 containing an amount of a soluble copper salt sufficient to yield an excess of copper ions of from about 2 to about 20 mole percent over the copper content of copper myxin.

19. A pharmaceutical cream composition according to claim 17 which comprises:
   a. from about 0.45% to about 0.60% by weight based on the total weight of the cream of copper myxin in micronized form;
   b. from about 10% to about 15% by weight based on the total weight of the cream of a petrolatum having a melting point range of from about 38° to about 50°C. and a hydrocarbon chain length of from about 20 to about 22 carbon atoms;
   c. from about 15% to about 20% by weight based on the total weight of the cream of stearyl alcohol;
   d. from about 5% to about 7% by weight based on the total weight of the cream of a polyoxyethylene glycol emulsifying agent which is soluble in water and alcohol, insoluble in cottonseed oil and mineral oil and milky in propylene glycol;
   e. from about 12% to about 15% by weight based on the total weight of the cream of propylene glycol;
   f. from about 0.5% to about 0.8% by weight based on the total weight of the cream of hydroxypropylmethyl cellulose having a viscosity of 4000 centipoises in a 2% aqueous solution at 20°C.; and
   g. from about 42% to about 58% by weight based on the total weight of the cream of water.

20. A pharmaceutical cream composition according to claim 19 wherein the water component comprises an aqueous buffer solution at a pH of from 5.7 to 6.2 containing 0.019% by weight, based on the total weight of the cream, of cupric acetate monohydrate and 0.20% by weight, based on the total weight of the cream, of sodium acetate trihydrate.

21. A method for the treatment of topical microbial infections on mammals which comprises applying to the site of the infection an amount of a cream as defined in claim 15 which is effective in treating the topical microbial infection.

22. A method for the treatment of topical microbial infections on mammals which comprises applying to the site of the infection an amount of a cream as defined in claim 17 which is effective in treating the topical microbial infection.

23. A method for the treatment of topical bacterial infections on mammals which comprises applying to the site of the infection an amount of a cream formulation as defined in claim 18 which is effective in treating the topical bacterial infection.

24. A method for the treatment of topical microbial infections on mammals which comprises applying to the site of the infection an amount of a cream as defined in claim 19 which is effective in treating the topical microbial infection.

25. A method for the treatment of topical microbial infections on mammals which comprises applying to the site of the infection an amount of a cream as defined in claim 20 which is effective in treating the topical microbial infection.

26. A pharmaceutically acceptable ointment composition, efficacious in the treatment of topical microbial infection, which comprises as the active ingredient an amount which is effective in treating the topical microbial infection of from about 0.1% to about 1.5% of copper myxin in a petrolatum base.

27. A pharmaceutical ointment composition as defined in claim 26 wherein the copper myxin is in micronized form.

28. A pharmaceutical ointment composition according to claim 26 comprising:
   a. from about 0.1% to about 1.5% by weight based on the total weight of the ointment of copper myxin in micronized form;
   b. from about 2% to about 20% by weight based on the total weight of the ointment of a solvent which wets the copper myxin and is compatible with the excipients in the ointment composition and
   c. from about 80% to about 98% by weight based on the total weight of the ointment of petrolatum having an average hydrocarbon chain length of from about 20 to about 22 carbon atoms and a melting point range of from about 38° to about 50°C.

29. A pharmaceutical ointment composition according to claim 28 which comprises:
   a. from about 0.45% to about 0.60% by weight based on the total weight of the ointment of a copper myxin complex in micronized form;
   b. from about 6% to about 8% by weight based on the total weight of the ointment of a solvent which wets the copper myxin and is compatible with the excipients in the ointment composition and
   c. from about 91.5% to about 93.5% by weight based on the total weight of the ointment of a petrolatum having an average hydrocarbon chain length of from about 20 to about 22 carbon atoms and a melting point range of from about 38° to about 50°C.

30. A method for the treatment of topical microbial infections on mammals which comprises applying to the site of the infection an amount of an ointment as defined in claim 26 which is effective in treating the topical microbial infection.

31. A method for the treatment of topical microbial infections on mammals which comprises applying to the site of the infection an amount of an ointment as defined in claim 28 which is effective in treating the topical microbial infection.

32. A method for the treatment of topical microbial infections on mammals which comprises applying to the site of the infection an amount of an ointment as defined in claim 29 which is effective in treating the topical microbial infection.

* * * * *